United States Patent [19]

Ogura et al.

[11] Patent Number: 5,555,321
[45] Date of Patent: Sep. 10, 1996

[54] IMAGE DATA BINARY CODING METHOD AND APPARATUS

[75] Inventors: Hirokazu Ogura; Kazuo Kaneko; Tadayoshi Kono, all of Yokohama, Japan

[73] Assignee: Fujitsu Limited, Kanagawa, Japan

[21] Appl. No.: 248,953

[22] Filed: May 25, 1994

[30] Foreign Application Priority Data

Nov. 19, 1993 [JP] Japan .................................. 5-290450

[51] Int. Cl.[6] ................................................ G06K 9/36
[52] U.S. Cl. .................................... 382/235; 382/250
[58] Field of Search ............................ 382/232, 233, 382/234, 235, 240, 248, 250, 244, 245, 246, 247; 348/403, 405, 406, 420, 422

[56] References Cited

U.S. PATENT DOCUMENTS 5,379,356  1/1995  Purcell et al. .......................... 382/56
5,387,982  2/1995  Kitaura et al. ......................... 358/433
5,416,854  5/1995  Fukuda et al. ......................... 382/232

*Primary Examiner*—Joseph Mancuso

[57] ABSTRACT

A method and device for decoding received coded image data for image compression in moving picture telecommunication, wherein data are subjected to discrete cosine transformed coded compression to enhance decoding processing performance. To reproduce high precision moving pictures, positional information within an image block is scanned by a run/level dividing device from run values of the received data composed of the combination of run values and level values. Each pair of run and level values are subjected to a reverse quantifying process to form pairs of position and level values wherein the positional information and the level values correspond to each other. The level values are transformed into positional information using the zigzag scan and are also reverse quantified. A reverse discrete cosine transforming device carries out processing of the reverse quantified data to decode the image data.

7 Claims, 12 Drawing Sheets

FIG.7

| POSITIONAL INFORMATION | 1 | | 2 | | | | 5 | |
|---|---|---|---|---|---|---|---|---|
| REVERSE QUANTIFIED DATA | A (10) | | B (5) | | | | C (7) | |
| MULTIFIER COEFFICIENT | 1 | 2 | 3 | 4 | 1 | 2 | 3 | 4 |
| MLT(OUT) | 10 | 20 | 30 | 40 | 5 | 10 | 15 | 20 | | | | | 7 | 14 | 21 | 28 |
| ADDED DATA | 0 | 0 | 0 | 0 | 10 | 20 | 30 | 40 | | | | | 0 | 0 | 0 | 0 |
| OUTPUT | | | | | 15 | 30 | 45 | 60 | | | | | | | | |

ONE-DIMENSIONAL IDCT DATA (1ST ROW) →

FIG.11

| 1 | 2 | 6 | 7 |
|---|---|---|---|
| 3 | 5 | 8 | 13 |
| 4 | 9 | 12 | 14 |
| 10 | 11 | 15 | 16 |

FIG.12

| 1 | 2 | 3 | 4 |
|---|---|---|---|
| 5 | 6 | 7 | 8 |
| 9 | 10 | 11 | 12 |
| 13 | 14 | 15 | 16 |

FIG.13

| FIG. 11 | FIG. 12 | FIG. 11 | FIG. 12 |
|---------|---------|---------|---------|
| 1 | 1 | 4 | 9 |
| 2 | 2 | 9 | 10 |
| 6 | 3 | 12 | 11 |
| 7 | 4 | 14 | 12 |
| 3 | 5 | 10 | 13 |
| 5 | 6 | 11 | 14 |
| 8 | 7 | 15 | 15 |
| 13 | 8 | 16 | 16 |

FIG.14

| 1 | 5 | 9 | 13 |
|---|---|---|----|
| 2 | 6 | 10 | 14 |
| 3 | 7 | 11 | 15 |
| 4 | 8 | 12 | 16 |

FIG.15

| FIG. 12 | FIG. 14 | FIG. 12 | FIG. 14 |
|---|---|---|---|
| 1 | 1 | 9 | 3 |
| 2 | 5 | 10 | 7 |
| 3 | 9 | 11 | 11 |
| 4 | 13 | 12 | 15 |
| 5 | 2 | 13 | 4 |
| 6 | 6 | 14 | 8 |
| 7 | 10 | 15 | 12 |
| 8 | 14 | 16 | 16 |

IMAGE DATA BINARY CODING METHOD AND APPARATUS

BACKGROUND OF THE INVENTION

The present invention relates to a decoding technique for compressed pictures as in moving picture telecommunication, and more particularly to a technique which enhances a decoding processing performance and may cope with a high precision reproduction of moving pictures in the case where compressed data through discrete cosine transform coding process are to be decoded.

In the image data telecommunication, instead of transmitting the images per se, the data may be transferred by analyzing frequency components contained in the images. The public's attention is paid to a DCT (Discrete Cosine Transform) in which the images are represented by groups of frequency components. The literature that introduces the DCT technique is "Digital Television" of Nikkei New Media (extra number) published by Nikkei BP inc. 1992. particularly, at Chapter 2 (pp 20–34) entitled "Compression Technique and Digital Compression Basic Technique for International Standardization (A)".

In the DCT system, the multiple value image is divided into blocks composed of a predetermined number (for instance 8×8 pixels) of blocks, the image data are orthonormalized to obtain a matrix composed of transform coefficient for each block, and each component of the matrix is quantified by using corresponding visible threshold values and converted into variable length codes to thereby complete the compression of the data amount.

In case of decoding the image data thus compressed and coded, a system as shown in a block diagram of FIG. 2 has been realized based upon CCITT Advice H. 261 (MPEG1: Moving Picture Experts Group 1).

In FIG. 2, first of all, the coded data (image data) that have been received through a telecommunication network is transformed into run/level data composed of "run" information (continuous number of "0" components) and "level" (frequency components of the image) in a variable length decoding section 101. Subsequently, in a run length decoding section 104, the run/level data are converted into block type data (run length decoded data 32) whose level values are registered at respective pixel positions of the blocks.

Subsequently, the run length decoded data 32 are multiplied by a reverse quantifying coefficient 33 in a reverse quantifying section 102.

Next, since the data have been subjected to a zigzag scan process for the run length coding on the transmission side, the data are zigzag-raster transformed and rearranged within the block (zigzag-raster transform data 35.

Thereafter, the data are multiplied by IDCT coefficients to obtain one-dimensional IDCT data 37 (one-dimensional IDCT section 103a).

Subsequently, the arrangement transform of the data is carried out in row and column directions (arrangement transform data 38), and the arrangement transformed data 38 are again multiplied by IDCT coefficients (two-dimensional IDCT section 103b). Thus, the obtained data are referred to as decoded data 39.

The arithmetic process of the data values explained above will be explained in more detail with reference to FIG. 3.

First of all, in FIG. 3, it is assumed for the sake of explanation that a size of one block be composed of 4×4 pixels.

The coded image data received in FIG. 3 are converted in the variable length coding section into serial data composed of zero run (the serial number of "0", expressed simply by "RUN" in FIG. 3) and level (representative of an amplitude of the frequency component of the image, shown simply by "LEVEL" in FIG. 3).

In the run length decoding section, the above-described levels are stored in the respective pixel positions and are converted into the block data type run length decoded data 32.

The multiplying of the run length decoded data 32 and the quantifying coefficients 33 is carried out by multiplying the level values at the same positions in the block by each other.

The thus obtained qualified data 34 are zigzag-raster transformed and converted into the data 35. This transform may be obtained by scanning the data obtained through scanning the reverse quantified data 34 in every row "10→5→7→0→6→0→0→2→3→0→0→0→0→0→0→0" (in this order) in the zigzag-raster direction (as indicated by arrows in the data 35).

The zigzag-raster data 35 are further multiplied by the IDCT coefficients 36 to obtain the one-dimensional DCT data 37. Each value of the one-dimensional DCT data is multiplied by the row of the zigzag-raster transformed data 35 and the column of the IDCT multiplying coefficient 36. The example is given as follows:

first row first column: $10 \times 1 + 5 \times 1 + 0 \times 5 + 0 \times 5 = 15$
first row second column: $10 \times 2 + 5 \times 2 + 0 \times 6 + 0 \times 6 = 30$
second row first column: $7 \times 1 + 6 \times 1 + 2 \times 5 + 0 \times 5 = 23$ After the thus obtained one-dimensional DCT data 37 have been subjected to the matrix transformation to be rearranged and transformed into the data 38, the data 38 is further multiplied by the IDCT coefficients 36 to obtain the two-dimensional DCT data 39.

How To Get Values of Two-Dimensional DCT Data.

first row first column: $15 \times 1 + 23 \times 1 + 3 \times 5 + 0 \times 5 = 53$
first row second column: $15 \times 2 + 23 \times 2 + 3 \times 6 + 0 \times 6 = 94$
second row first column: $30 \times 1 + 38 \times 1 + 6 \times 5 + 0 \times 5 = 98$ In the above-described run length decoding process, zigzag-raster transform process and arrangement transform process, in order to arrange or rearrange the values in the block, it is necessary to repeatedly carry out the read/write processes to RAMs.

However, in the image processing corresponding to a high resolving power image signals which will require a real time process as in HDTVs (High Density Television), in order to enhance the decoding processing performance, a plurality of RAMs are used the IDCT calculations have to be carried out in parallel or simultaneously for every row or every column, resulting in complicated or enlarged structure of circuits as well as an increased cost for the system.

Furthermore, as is apparent from FIG. 3, in the conventional system, the data received in the initial stage of the various calculation are transformed into a so-called block data type in consideration of the pixel positions within the block. Accordingly, it is necessary to carry out the process for a large number of "0" components in the reverse qualifying calculation, zigzag-raster transform, one-dimensional IDCT calculation, rearrangement/transform and two-dimensional IDCT calculation. The present inventors have just found out the fact that this is one of the factors which limit or suppress the improvement in processing efficiency.

In view of the foregoing defects, an object of the present invention is to provide a technique for effectively carrying out the decoding process of the image at a high speed by reducing the calculation amount of data and suppressing the data control through the RAM access.

SUMMARY OF THE INVENTION

According to the present invention, positional information within a block is picked up from zero run values by a run/level dividing means relative to variable length data composed, in combination, of zero run values and level values and used as pair data where the positional information and level values are caused to correspond to each other. A reverse quantifying process is carried out by a reverse quantifying means in the form of the pair data without any change thereto. On the other hand, the level values are caused to correspond to the level values transformed into positional information assuming the zigzag scan and reverse quantified in the aforementioned manner. A reverse cosine transform means performs a process the reverse quantified data of the pair data form thus obtained, to thereby decode the image data.

According to the present .invention, since the calculation is not carried out for the elements of "0" as mentioned before, it is possible to considerably reduce the load to be imposed on the calculation process. Also by holding the level values in the pair data form to which the positional information representative of the positions within the block is caused to correspond, in the reverse quantifying calculation and the IDCT calculation, since the particular selection of the coefficient for the components to be multiplied is possible, there is no disadvantage at all in comparison with the case where the calculation is carried out in the block data form in the conventional manner.

Also, according to the invention, although the transform of the positional information in the pair data is required, its transform regulation is quite clear. For instance, when the IDCT calculation is carried out after the reverse quantifying process, if the positional information is transformed into the positional information simulating the zigzag-raster scan within the block, it is possible to obtain the output in the same manner as in the execution of the zigzag-raster scan with the arrangement of the level values during the reverse quantifying process without any change. Also, in the case where the two-dimensional reverse discrete cosine transform is carried out for the one-dimensional reverse discrete cosine transformed data, the arrangement transform of the matrix within the block is required, but this may be easily carried out by transforming the positional information in the manner described above. For this reason, it is unnecessary to use the elements which need a long time for read/write the data, such as RAMs or the like. It is also possible to execute the transform process for the data only with the high speed elements such as counters and logic circuits.

BRIEF DESCRIPTION OF THE DRAWINGS

In the accompanying drawings:

FIG. 7 is a time chart showing signal conditions of the IDCT section;

FIG. 11 is a view showing the arrangement in block image of the reverse quantified data;

FIG. 12 is a view showing the rearrangement of the reverse quantified data for the IDCT transform;

FIG. 13 is a chart showing the correspondence of the positional information in FIGS. 11 and 12;

FIG. 14 is a view showing the positional information which has been transformed in arrangement by the two-dimensional IDCT section; and FIG. 15 is a chart showing the correspondence of the positional information in FIGS. 12 and 14.

DESCRIPTION OF THE PREFERRED EMBODIMENTS

Figure 10:
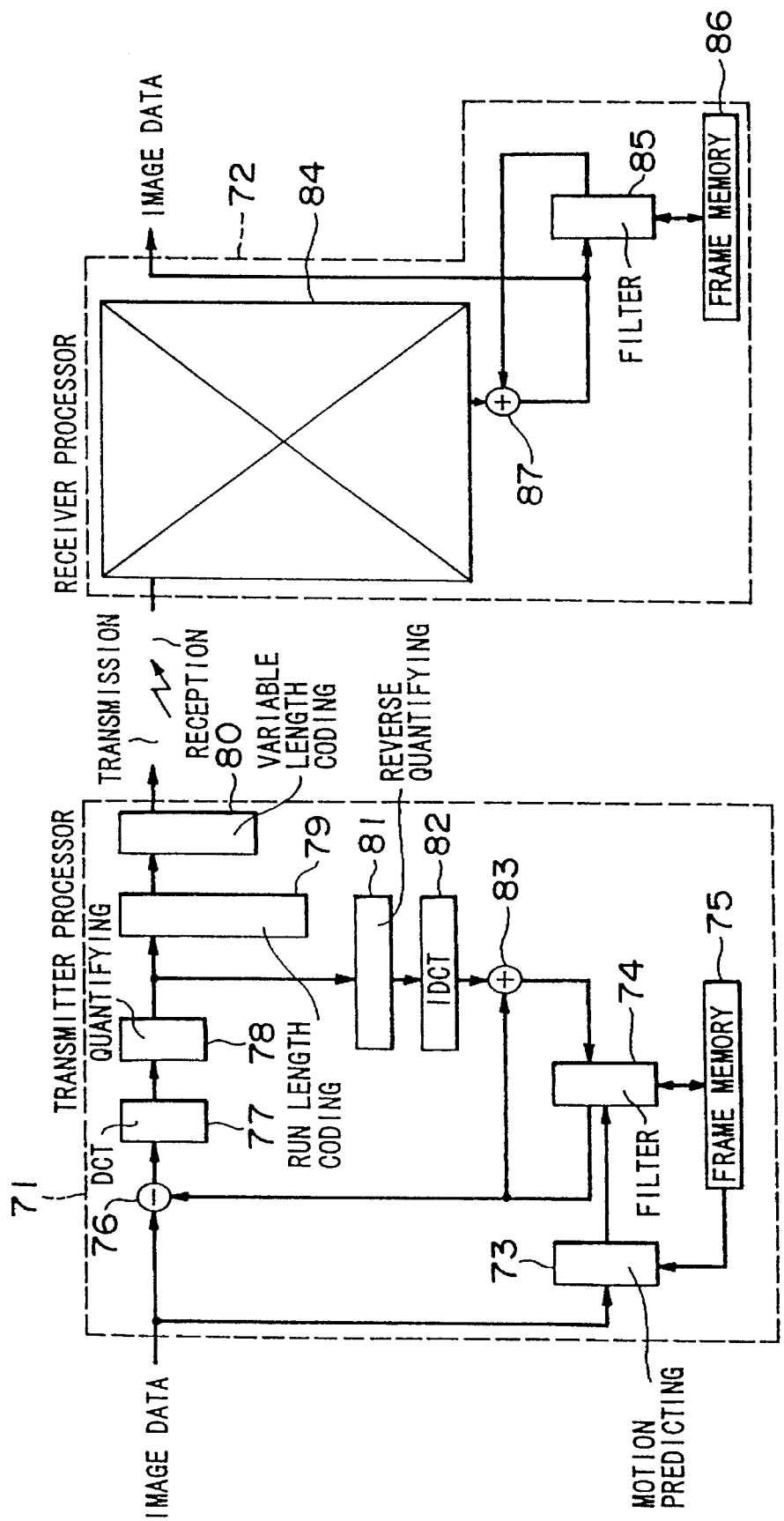
FIG. 10 is a block diagram showing an overall structure of an image telecommunication system in accordance with the embodiment.

A system shown in FIG. 10 is comprised of a transmitter side processor 71 and a receiver side processor 72. Image data inputted into the transmitter side processor 71 are subjected to a constant process in the transmitter side processor 71 and fed to the receiver side processor 72 where the received data are subjected to a constant process to reproduce the image data.

Each function of the transmitter side processor 71 and the receiver side processor 72 will be explained.

Transmitter Side Processor 71

In the transmitter side processor 71, a motion predicting section 73 has a function for calculating a motion vector for each macro block by comparing a current frame of the image data to be inputted with a frame that has been inputted immediately before.

A filter section 74 reads out a pseudo current frame from a frame memory 75 on the basis of the motion vector inputted from the above-described motion predicting section 73.

Then, a differential detector 76 detects a difference between the pseudo current frame that has been read out from the filter section and the current frame that has been inputted as image data. Thus, the data which relate to the parts having no motion relative to the previous frame are omitted for the purpose of reduction of the transmitted data.

Subsequently, after the differential data derived from the differential detector 76 has been DCT transformed in DCT section 77, the data are quantified in quantifying section 78. The thus obtained quantified data are subjected to the run length coding process in run length coding section 79, and then are subjected to variable length coding in variable length coding section 80 for transmission.

On the other hand, in order to reproduce the current frame for comparison with the next frame, the quantified data obtained from the quantifying section 78 are subjected to the reverse quantifying process and IDCT transform (reverse quantifying section 81 and IDCT section 82). Then, in additional section 83, the data are added with the pseudo current frame to reproduce the current frame and are stored in a frame memory 75 through the filter section 74.

Receiver Side Processor 72

The receiver side processor 72 is comprised of the image data decoder 84. The previous decoded frame is added to the data decoded in the image data decoder 84 (in additional section 87) to reproduce the current decoded frame (which is to be outputted as the image data). Incidentally, in order to reproduce the next decoded frame, the current decoded frame is stored in a frame memory 86 through a filter section 85.

Figure 4:
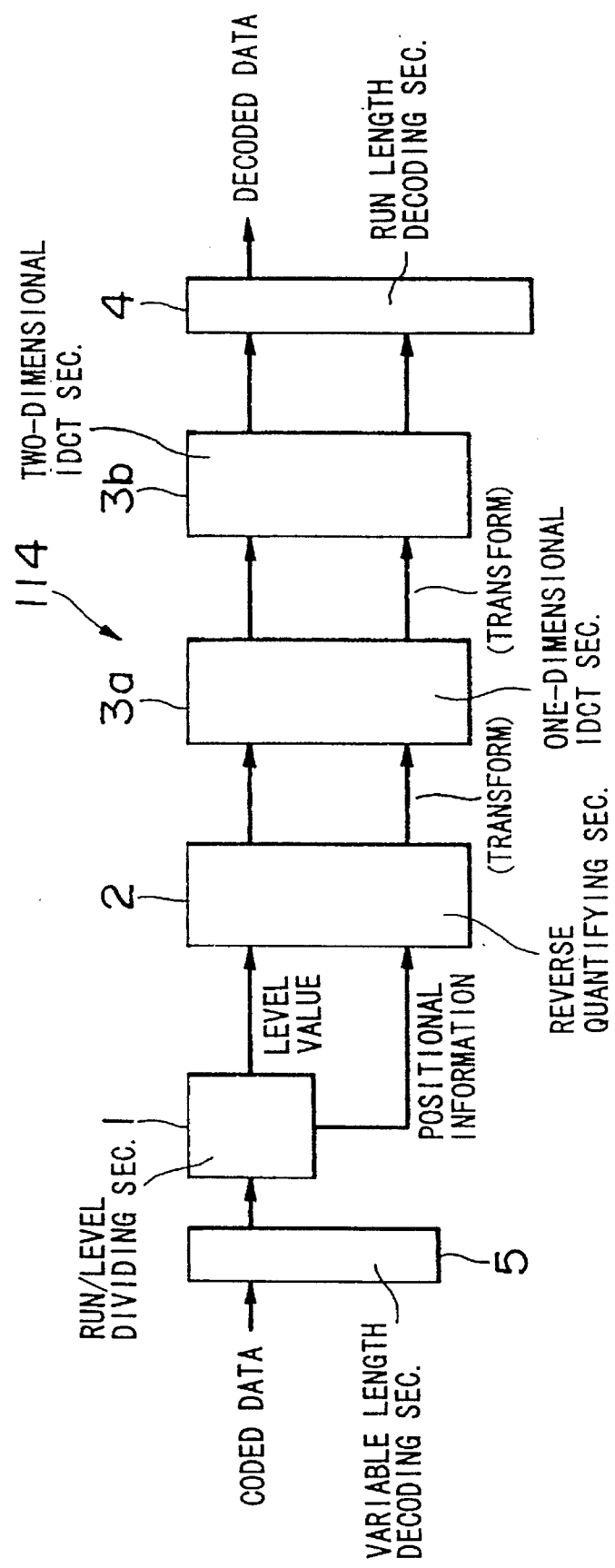
FIG. 4 is a block diagram showing a decoding apparatus for image data in accordance with an embodiment of the invention.

FIG. 4 is a view showing a detailed structure of the image data decoder 84 shown in FIG. 10.

The image data decoder 84 is composed of a variable length decoding section 5, a run/level dividing section 1, a reverse qualifying section 2, a one-dimensional IDCT section 3a, a two-dimensional IDCT section 3b and a run length decoding section 4. Each function will be described.

Variable Length Decoding Section 5

Figure 5:
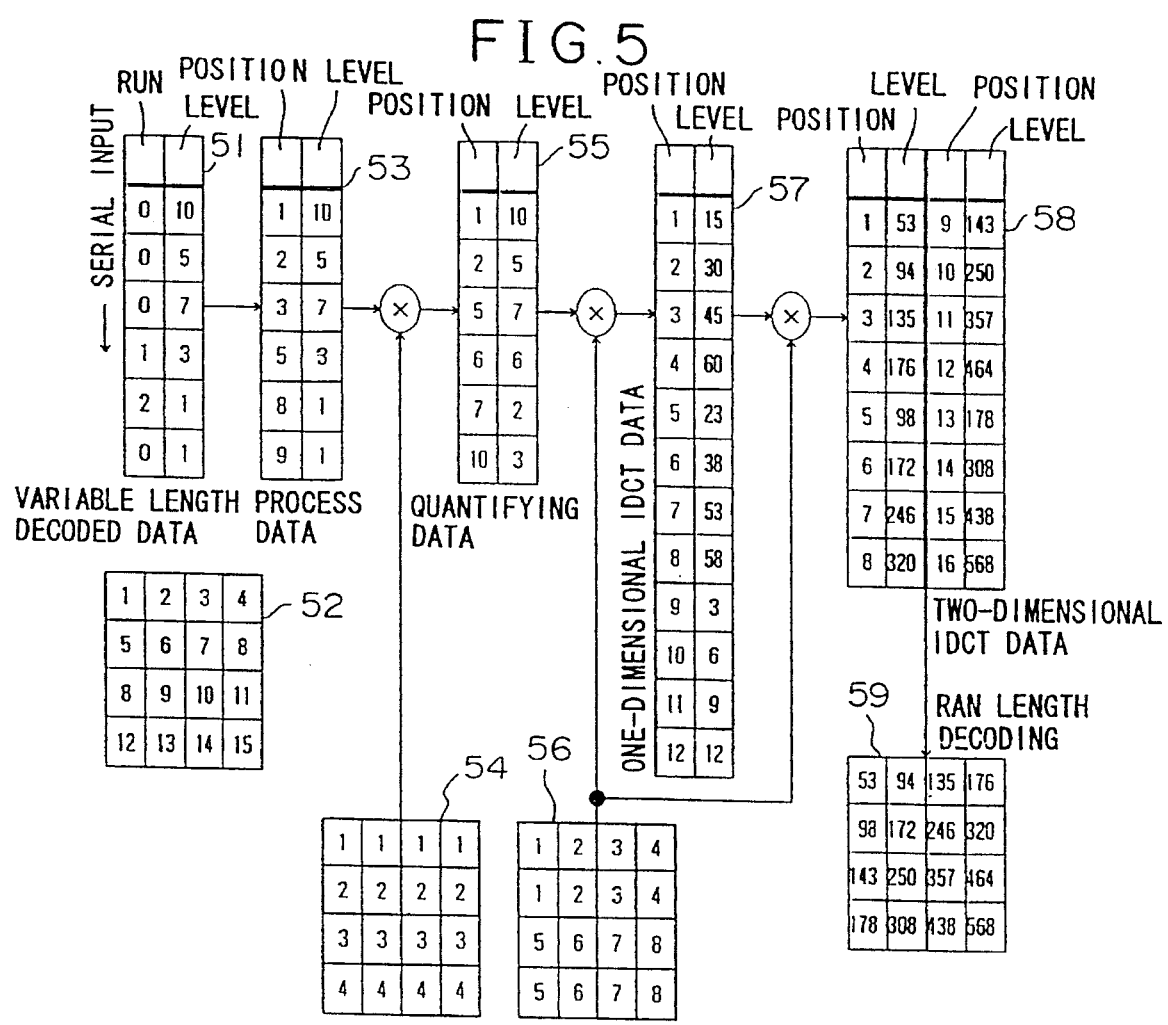
FIG. 5 is an illustration for an example of calculation process in decoding data in accordance with the embodiment of the invention.

The variable length decoding section 5 provides variable length decoding data 51 from the coded data. As shown in FIG. 5, in the variable length decoded data 51, the number of zero "runs" (i.e., the serial number of "0") and the level values are set as pairs and coded as one code. Accordingly, the variable length decoded data 51 represent the number of zero "runs" which MSB number bit always has.

Run/Level Dividing Section 1

In the run/level dividing section 1, in view of the above-described variable length decoded data 51, the latter are simply divided by a bit width, and the number of runs are added to the data to calculate the positional information corresponding to the level values. Namely, the correspondence of the variable length decoded data 51 to the level values by calculating the positional information based upon the level position map 52 is shown in the process data 53 (pair data) in FIG. 5.

Reverse Quantifying Section 2

Figure 1:
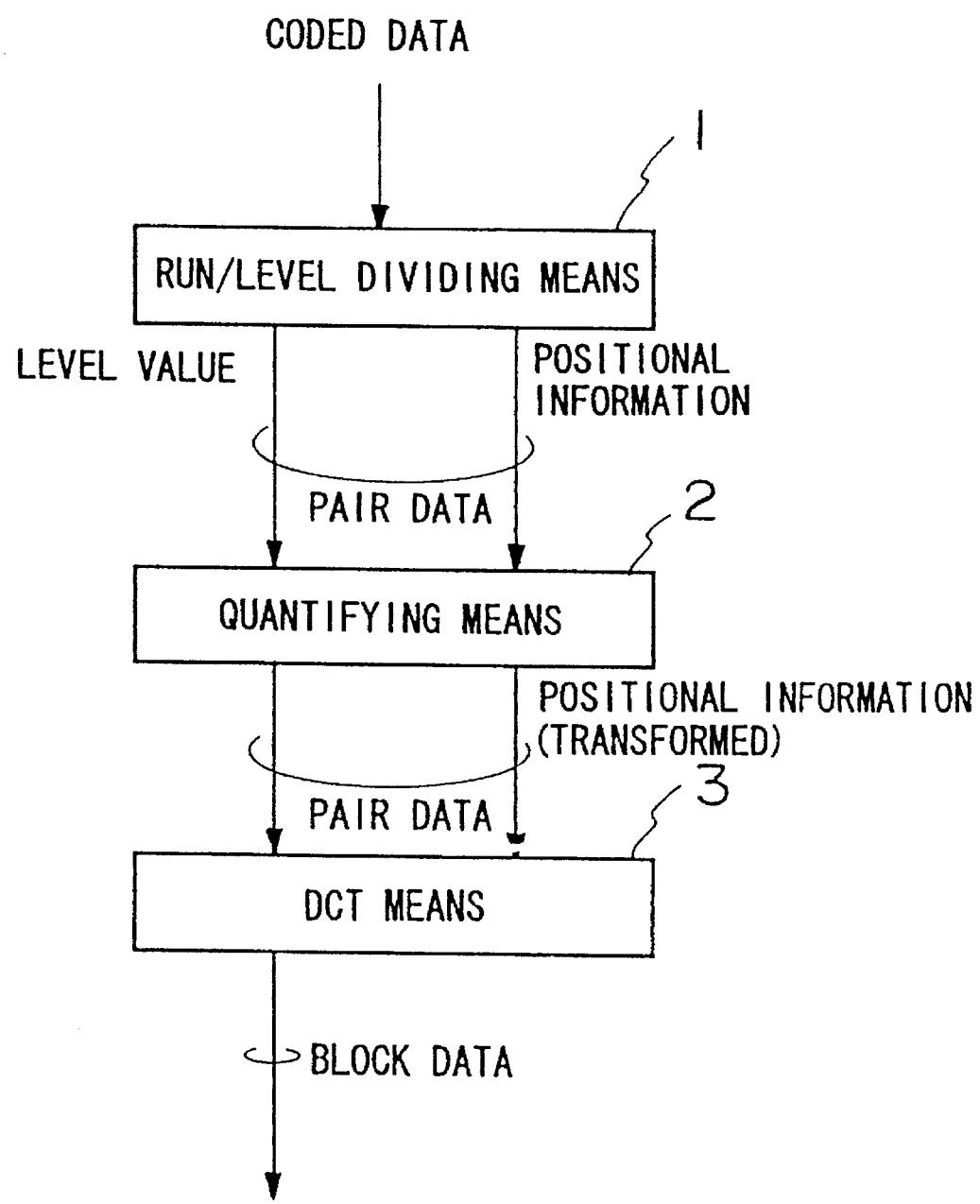
FIG. 1 is a view showing a principle of the present invention.
Figure 2:
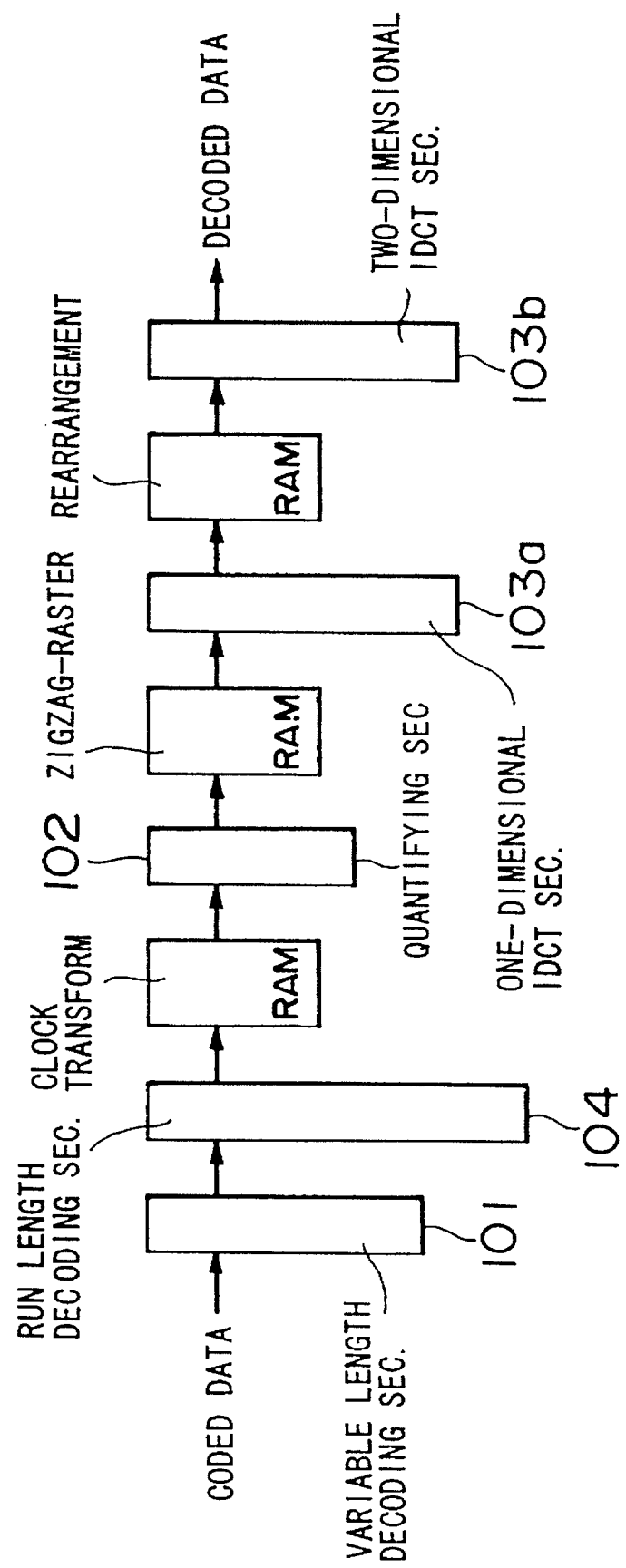
FIG. 2 is a block diagram showing a conventional decoding apparatus for image data.
Figure 3:
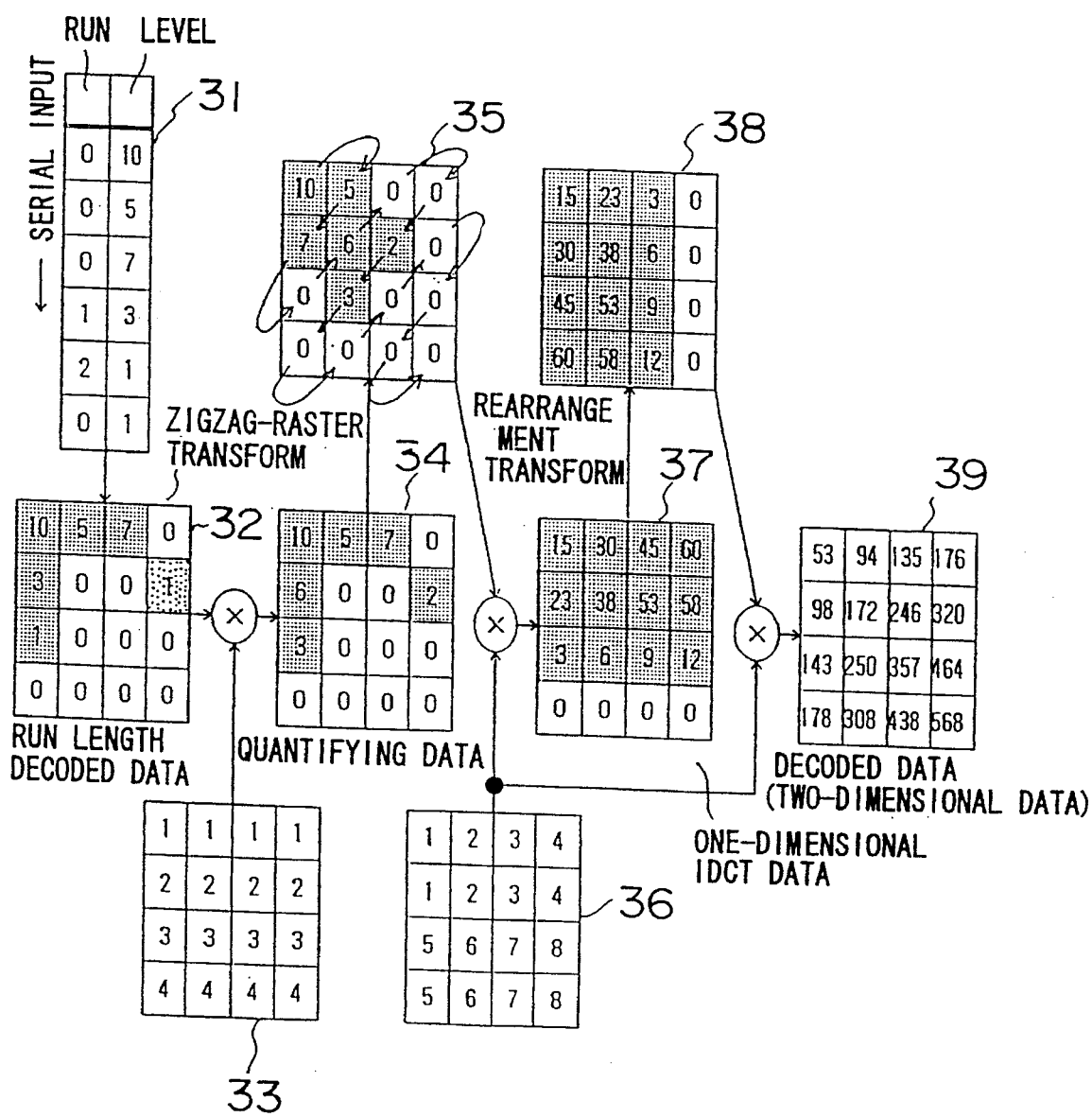
FIG. 3 is an illustration :for an example of conventional calculation process in decoding data.

In the reverse quantifying section 2, the coefficients are determined with reference to the reverse quantifying coefficients 54 on the basis of the positional information of the process data 53, and the multiplying calculation with the level values is carried out to calculated the reverse quantified level values. At this time, when the reverse quantifying is carried out in the embodiment, the calculation process is carried out without any change to the pair data style on the basis of the positional information. Accordingly, assuming the pixel positions in the block, no calculation process is carried out for the components which are related to the level values of "0". This ensures the remarkable effect also in comparison with the conventional system shown in FIG. 3. Namely, in FIG. 3, assuming the block of the coded data are transformed into the run length decoded data (4×4=16 pixels) prior to the reverse quantifying process. For this reason, upon the quantifying, the calculation process is carried out for all the pixels (4×4=16). In contrast, according to the present embodiment, it is sufficient that the calculation process is carried out only for the six level values other than the "0" components.

One-Dimensional IDCT Section 3a

The one-dimensional IDCT section 3a carries out the process for transforming the positional information of the reverse quantified process data into the new positional information that simulates the zigzag-raster transform, and the process for determining the IDCT coefficients on the basis of the new positional information and multiplying the data by the coefficients.

The transform of positional information will now be described.

The reverse quantified data are the data that have been zigzag scanned. This may be explained by using the block image shown in FIG. 11. In FIG. 11, the arrangement order from the small numbers to the large numbers is shown in a zigzag manner.

The reverse quantified data arranged in this manner should be rearranged as shown in FIG. 12 for the IDCT transform.

The chart shown in FIG. 13 shows the correspondence in positional information based upon FIGS. 11 and 12.

Based upon such a correspondence, the positional information is transformed and caused to correspond to the level values that is reverse quantified, to obtain the reverse quantified data 55 shown in FIG. 5. Since in the embodiment, the zigzag-raster transform is simulated to transform the positional information based upon the positional information corresponding to the level values, it is unnecessary to use RAMs for carrying out the positional transform of the level values themselves, and it is possible to considerably enhance the processing speed independently of the access speed of the RAMs.

In the one-dimensional IDCT section 3a, the IDCT coefficients 56 are multiplied to the reverse quantified data 55 to carry out the calculation process of the one-dimensional IDCT data 57.

In the one-dimensional IDCT process corresponding to the level values, on the basis of the positional information of the reverse quantified data 55, the IDCT coefficients are determined and multiplied with the level values corresponding to the IDCT coefficients. Also, in the embodiment, since the calculation process is carried out for the pair data style without any modification while removing the components of "0" level values, the number of calculation steps is small. In comparison with the conventional system shown in FIG. 3, in FIG. 3, the multiplication is carried out for all the components (16 components) of the data 35 that have been zigzag-raster transformed from the reverse quantified data 34, whereas in the embodiment, the multiplication is sufficiently carried out only for six components.

The structure of the hardware and function of the one-dimensional IDCT section 3a will be explained with reference to FIGS. 6 and 7.

Figure 6:
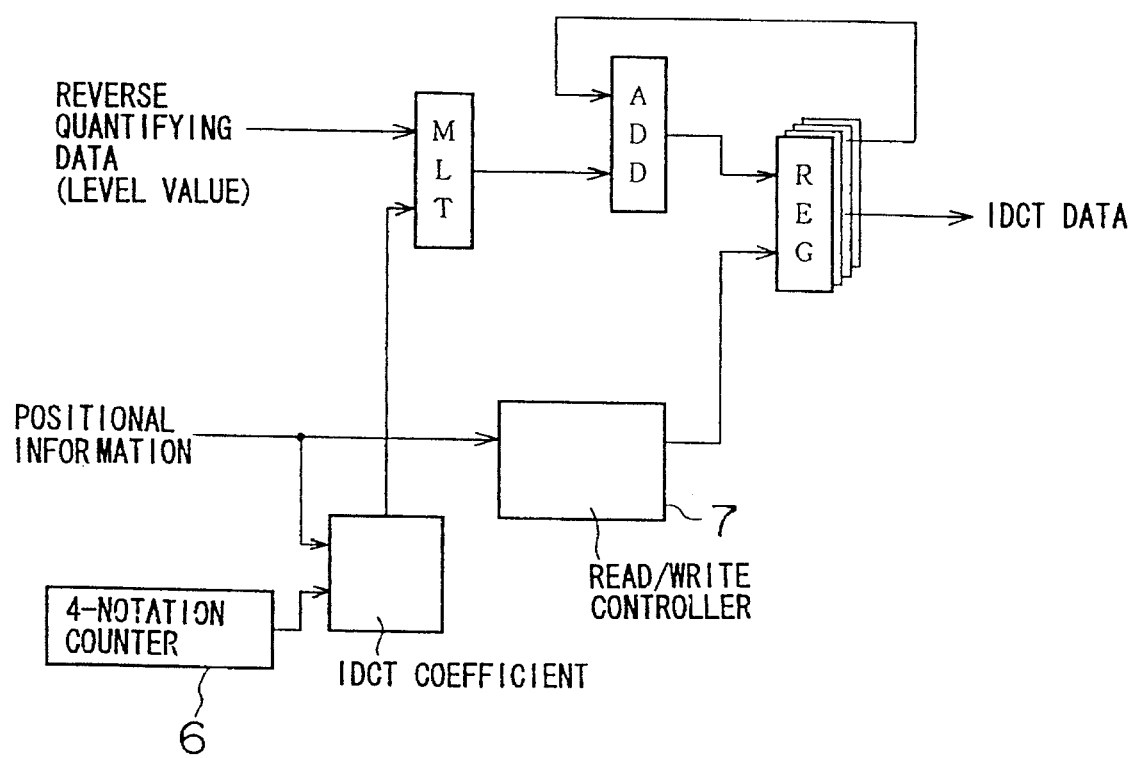
FIG. 6 is a block diagram showing a structure of an IDCT section.

In FIG. 6, MLT denotes a multiplier, and ADD denotes an adder. The IDCT coefficients are stored in, for example, RAM, ROM and the like, which outputs the coefficients in accordance with the positional information and the instruction from a quad notation counter 6. The multiplier multiplies the level values of the reverse qualified data and the above-described IDCT coefficients and outputs -the result to the adder ADD.

The output of the adder ADD is inputted into the registers REG. The read/write of the registers REG provided for every rows is controlled by the read/write controller 7 which determines, from the positional information of the reverse quantified data, whether or not the data to be added next is present and gives the allowance of readout of the registers. Next, the determination is carried out as follows, as to whether the data to be added next is present.

The reverse qualified data to be inputted into the one-dimensional IDCT section 3a are in the order of the zigzag scan as mentioned before.. For this reason, as shown in the block image (8×8=16 pixels in this case) in FIG. 8, in the read/write controller 7, the positional information of the hatched portion on the right side end is received therein to judge the input of the final data of the row.

Subsequently, arithmetic calculation will be explained in detail with reference to the timing chart shown in FIG. 7. Incidentally, the arithmetic calculation is similar to the one-dimensional IDCT calculation shown in FIG. 5 (or FIG. 3).

"1" is inputted as the positional information (n−1) from the reverse quantified delta, and "10"(A) is inputted as the level value corresponding to the positional information.

In the region where the level value is A(10), the values of the first row of the IDCT coefficient 56, i.e., "1", "2", "3" and "4" are orderly inputted as multiplication coefficients. Accordingly, "A×1=10, A×2=20, A×3=30 and A×4=40" are outputted from the multiplier MLT and are stored in the registers REG.

Subsequently, corresponding to the fact that "2" is inputted as the positional information (n), "2" (B) is inputted as the level value.

In the region B, the values of the second row of the IDCT coefficients 56, i.e., "1", "2", "3" and "4" are orderly inputted as the multiplication coefficients. Accordingly, "B×1=5, B×2=10, B×3=15 and B×4=20" are outputted from the multiplier MLT.

The output value relative to the positional information (n) from the multiplier MLT and the output value in the previous positional information (n−1) from the register REG are inputted into the adder ADD and are both added together. The value is outputted as the one-dimensional IDCT data (first row) "15, 30, 45 and 60".

Incidentally, when "5" is inputted as the next positional information (n+1), the next register REG is assigned, and the maintained value is the initial value "0".

Figure 8:
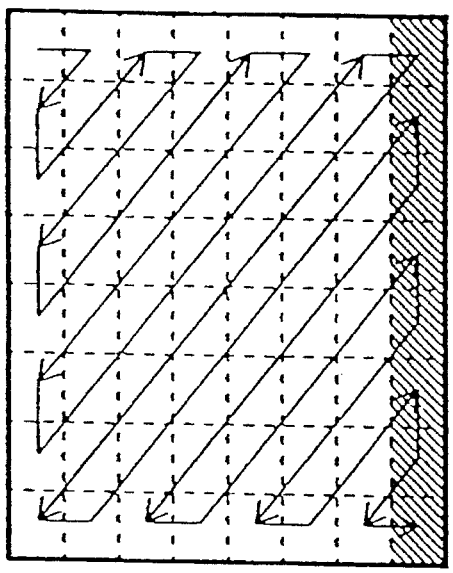
FIG. 8 is an illustration for a method of reading out final data of one row when reading data that have zigzag scanned.

As mentioned above, when the completion of the calculation of all the one-dimensional IDCT data is recognized on the basis of the principle shown in FIG. 8, the data are transferred to the two-dimensional IDCT section 3b together with the positional information.

Two-Dimensional IDCT Section 3b

In the two-dimensional IDCT section 3b, after the arrangement transform of the positional information has been completed, the same calculation as that for the above-descried one-dimensional IDCT process is carried out for the level value.

The positional information as arranged in FIG. 12 becomes that shown in FIG. 14 through the arrangement transform by the two-dimensional IDCT section 3b.

The corresponding chart of the positional information on the basis of FIGS. 12 and 14 is shown in FIG. 15.

On the basis of such a correspondence, the positional information is transformed. The correspondence of this to the one-dimensional IDCT level values is used as the one-dimensional IDCT data 37. Furthermore, the IDCT coefficients are determined on the basis of the positional information. The multiplication of the coefficients with the corresponding level values is carried out. The hardware structure and the calculation process of the two-dimensional IDCT section 3b will not be explained herein because they are the same as those explained in conjunction with FIG. 6.

Figure 9:
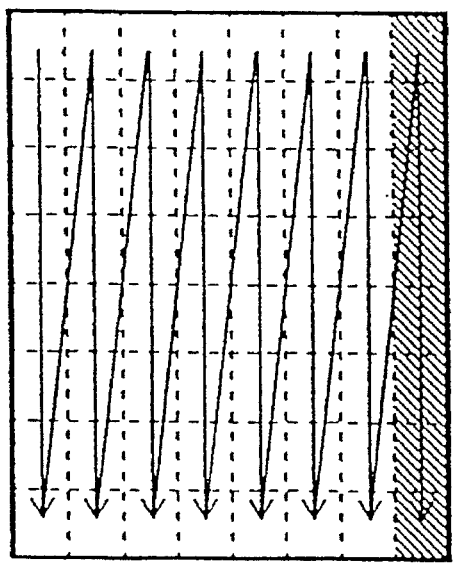
FIG. 9 is an illustration for a method of reading out final data of one row in arrangement transform of the positional information after the one-dimensional IDCT process.

Here, as shown in the block image (8×8=16 pixels in this case) in FIG. 9, in the read/write controller 7, the positional information of the hatched portion on the right side end is received therein to judge the input of the final data of the row.

Also, in the embodiment, since the calculation process is carried out for the variable length data without any modification while removing the components of "0" level values, the number of calculation steps is small. In comparison with the conventional system shown in FIG. 3, in FIG. 3, the multiplication is carried out for all the components (16 components) of the data 38 that have been the fixed length data style for replacement for the one-direction IDCT data 37, whereas in the embodiment, the multiplication is sufficiently carried out only for twelve components.

Run Length Decoding Section 4

After the two-dimensional IDCT calculation, the run length decoding section 4 performs compensation for "0" relative to the level value which has no positional information. Namely, the coded data are first transformed from the pair data style to the block data style herein. In the example shown in FIG. 5, when the two-dimensional IDCT calculation has been completed, since the values other than "0" are stored in all the sixteen pixels, the process for the run length decoding process is not necessary.

Thus, since for the sake of explanation one block is assumed to be 4×4=16 pixels, in the stage of the two-dimensional IDCT calculation, there is no "0" component of the level value. However, there are the cases where the "0" compensation through the run length decoding section 4 would be necessary in the case of the large block size over 8×8=16 pixels.

As described above, since any one of the reverse quantifying process, one-dimensional IDCT process and two-dimensional IDCT process is carried out in the form of the pair data style causing the positional information to correspond to the level value without any modification, it is possible to suppress the calculation process for the level values of the "0" component which is intrinsically redundant. As a result, since the amount of the data process may be reduced by one third to one tenth, the amount of data process may be enhanced by three times to ten times in the system as a whole.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A computer-implemented image data decoding method in image data telecommunication, for decoding received coded image data for each image block, wherein said received data for each image block are composed of a set of pairs of run and level values for each nonzero component for the image block, said run and level values being representative of amplitudes of frequencies contained in an image, and for calculating values of pixels arranged in a matrix form within each image block, said method comprising the following steps of:

converting said each run value to an index that indicates the position of the associated nonzero component in said image block and thus forming another set of pairs of position and level values for each nonzero component for the image block;

multiplying said each level value with a given reverse quantifying coefficient, and thus forming another set of pairs of position and quantified level values for each nonzero component;

transforming the positional information into new positional information that simulates a zigzag-raster scan and thus forming another set of pairs of simulated position and quantified level values for each nonzero component; and multiplying reverse discrete cosine coefficients based upon said new positional information for arranging the level values to obtain a pixel value for each of said pixels.

2. The method according to claim 1, wherein the step of multiplying reverse discrete cosine coefficients includes:

a step for one-dimensional reverse discrete cosine transform of calculating a one-dimensional reverse discrete cosine transformed value by multiplying said reverse quantified level values by reverse discrete cosine transform coefficients; and a step for two-dimensional reverse discrete cosine transform of generating new positional information by arranging and transforming the positional information within the image block so that said new positional information corresponds to said one-dimensional reverse discrete cosine transform value, and calculating a two-dimensional reverse discrete cosine transform value by multiplying said new positional information with a reverse discrete cosine transform coefficient for said new positional information.

3. The method according to claim 2, wherein the step of multiplying reverse discrete cosine coefficients further includes a step of decoding a run length value to compensate for level values having zero components and which form a positional information which is discontinuous as compared to the levels that have been subjected to said two-dimensional reverse discrete cosine transform.

4. An image data decoding apparatus in image data telecommunications, for decoding received coded image data for each image block, wherein said received data for each image block are composed of a set of pairs of run and level values for each nonzero component for the image block, said run and level values being representative of amplitudes of frequencies contained in an image, and for calculating values of pixels arranged in a matrix form within each image block, said apparatus comprising:

a run/level dividing unit for converting said each run value to an index that indicates the position of the associated nonzero component in said image block and thus forming another set of pairs of position and level values for each nonzero component for the image block;

a quantifying unit, coupled to said run/level dividing unit, for multiplying said each level value with a given reverse quantifying coefficient and thus forming another set of pairs of position and quantified level values for each nonzero component; and a reverse discrete cosine transforming unit, coupled to said quantifying unit, for transforming the positional information into new positional information that simulates a zigzag-raster scan and thus forming another set of pairs of simulated position and quantified level values for each nonzero component and multiplying reverse discrete cosine coefficients based upon said new positional information for arranging the level values to obtain a pixel value for each of said pixels.

5. The apparatus according to claim 4, wherein said reverse discrete cosine transforming unit includes:

a multiplier (MLT) for multiplying the level values of reverse quantified data corresponding to the positional information (n) with reverse discrete cosine transform coefficients;

an adder, coupled to said multiplier, for adding a multiplied result from said multiplier, obtained on the basis of the positional information (n−1); and a data holding unit, coupled to said adder, for outputting the added result held on the basis of an input of the positional information (n−1, n, n+1, . . . ).

6. The apparatus according to claim 4, wherein said reverse discrete cosine coefficient transforming unit includes:

an one-dimensional reverse discrete cosine transforming unit for calculating a one-dimensional reverse discrete cosine transformed value by multiplying said reverse quantified level values by reverse discrete cosine transform coefficients; and a two-dimensional reverse discrete cosine transforming unit for generating new positional information by arranging and transforming the positional information within the image block so that said new positional information corresponds to said one-dimensional reverse discrete cosine transform value, and calculating a two-dimensional reverse discrete cosine transform value by multiplying said new positional information with a reverse discrete cosine transform coefficient for said new positional information.

7. The apparatus according to claim 5, wherein said reverse discrete cosine coefficient transforming unit further includes a run length decoding unit for decoding a run length to compensate for level values having zero components and which form a positional information which is discontinuous as compared to the levels that have been subjected to said two-dimensional reverse discrete cosine transform.

* * * * *